No. 750,251. PATENTED JAN. 26, 1904.
T. BURKETT & L. C. DAVENPORT.
PLOW ATTACHMENT.
APPLICATION FILED JUNE 11, 1903.
NO MODEL.
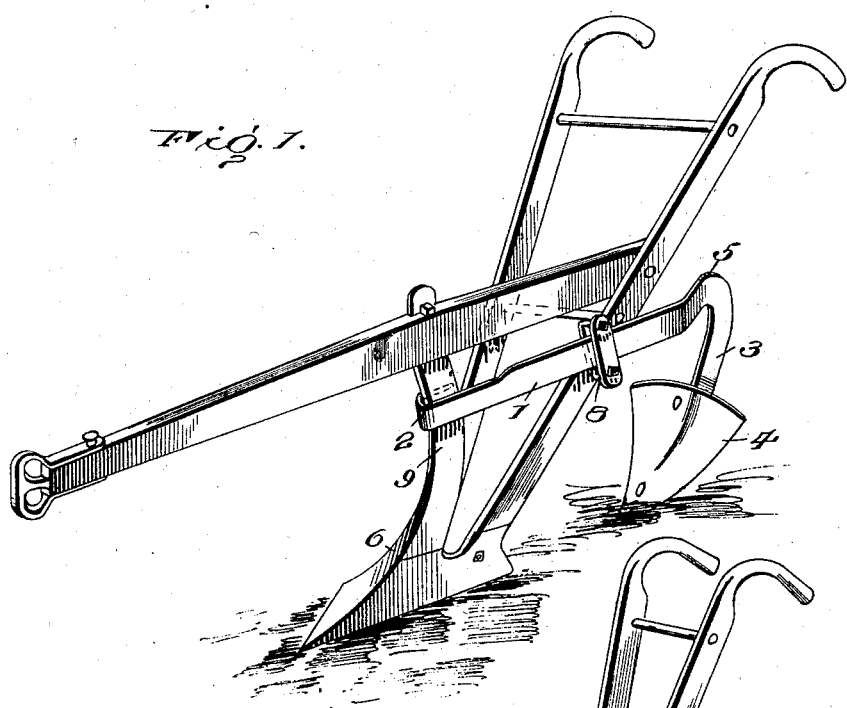
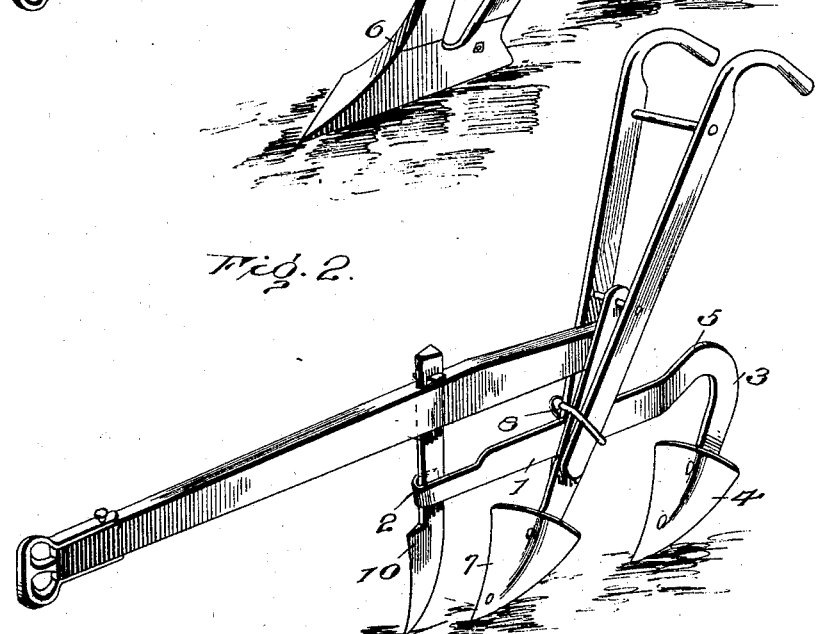
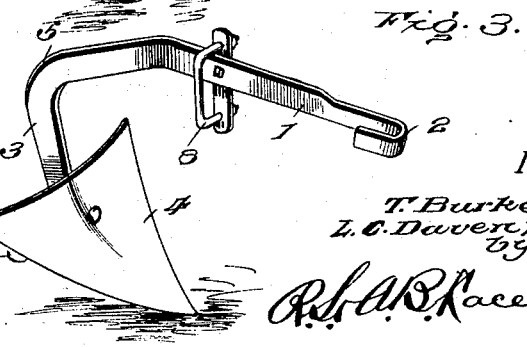
WITNESSES:
INVENTORS
T. Burkett.
L. C. Davenport.
By
R. S. & A. B. Lacey, Attorneys.

No. 750,251. Patented January 26, 1904.

UNITED STATES PATENT OFFICE.

THOMAS BURKETT AND LOT C. DAVENPORT, OF McCRORY, ARKANSAS.

PLOW ATTACHMENT.

SPECIFICATION forming part of Letters Patent No. 750,251, dated January 26, 1904.

Application filed June 11, 1903. Serial No. 161,085. (No model.)

*To all whom it may concern:*

Be it known that we, THOMAS BURKETT and LOT C. DAVENPORT, citizens of the United States, residing at McCrory, in the county of Woodruff and State of Arkansas, have invented certain new and useful Improvements in Plow Attachments, of which the following is a specification.

This invention provides an attachment adapted for conjoint operation with either a turning or shovel plow, as may be desired, according to the particular work to be performed, the attachment being adapted for operation either as a subsoiler or for covering grass or loosening the soil either for cultivating or breaking new land.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view showing the attachment applied to a turning-plow of ordinary construction. Fig. 2 is a perspective view showing the attachment in connection with a shovel-plow. Fig. 3 is a perspective view of the attachment.

Corresponding and like parts are referred to in the following description and indicated in all the views of the drawings by the same reference characters.

The device comprises a bar 1, provided at its forward end with a lateral hook 2 and at its rear end with a curved portion 3, forming a standard to which a plow-point or shovel 4 of any design is secured in any substantial way. The rear end portion of the bar 1 is deflected, as shown at 5, to throw the shovel or point 4 in the track of either the plow 6 or shovel 7. Any variety of point or shovel 4 may be applied to the lower end of the standard 3, according to the special use of the attachment. A clip 8 coöperates with the bar 1 to secure the same to a handle-bar of the plow or standard of the cultivator.

Fig. 1 shows the attachment applied to a turning or breaking plow, the hooked end 2 of the bar being engaged with the standard 9 of plow 6 and the bar 1 being clipped to the handle-bar of the plow. For plowing land upon which cotton or corn is growing the plow 6 makes a furrow, and the point 4 operates in the rear thereof for turning the soil upon the grass, weeds, and the like. When cultivating corn, the point 4 throws the soil toward the roots.

In the construction shown in Fig. 2 the cultivator or shovel-plow illustrated is provided with a colter 10, and the hooked end of the bar 1 is engaged with the shank of the colter, the bar being clipped to the standard of the shovel 7 and to the lower end of the handlebars. The construction admits of the point or shovel 4 being raised or lowered, thereby adapting the attachment for use either as a subsoiler or as an ordinary cultivator-shovel. The hook 2 projects laterally from the bar 1 and is in a plane at a right angle thereto, so as to engage around the standard, colter, or like part.

Having thus described the invention, what is claimed as new is—

1. An attachment for plows and like agricultural implements, the same consisting of a flat bar having its front end bent laterally to form a hook at one side of the bar, and having its rear portion curved downward and forward to provide a standard to receive a shovel or plow-point, the rear portion of the bar being laterally deflected, and a clip loose upon the bar for adjustable connection thereof to a support, substantially as specified.

2. In a plow or like implement, the combination of a beam, pendent portions attached to the beam longitudinally spaced, a flat bar placed against said pendent portions and having a lateral hook at its front end to engage around the front edge of the foremost pendent portion, and having its rear portion laterally deflected and curved downward and forward, and a clip embracing the bar and rear pendent portion and adjustably connecting them, substantially as set forth.

In testimony whereof we affix our signatures in presence of two witnesses.

THOMAS BURKETT. [L. S.]
LOT C. $\times$ DAVENPORT. [L. S.]
<sub>his</sub>
<sub>mark</sub>

Attest:
HUGH C. SHEARER,
A. J. MARSH.